United States Patent [19]

Aaron et al.

[11] Patent Number: 5,331,632

[45] Date of Patent: Jul. 19, 1994

[54] EXPANDABLE TIME SLOT INTERCHANGER

[75] Inventors: Calvin Aaron, Chicago; Ronald J. Canniff, Naperville, both of Ill.

[73] Assignee: AT&T Bell Laboratories, Murray Hill, N.J.

[21] Appl. No.: 829,799

[22] Filed: Jan. 31, 1992

[51] Int. Cl.$^5$ .................................. H04Q 11/04
[52] U.S. Cl. ........................................ 370/68
[58] Field of Search ............... 370/68, 54, 84, 66, 370/60, 68.1, 67, 85.1, 112, 85.9, 63, 65; 379/232, 229, 225, 219

[56] References Cited

U.S. PATENT DOCUMENTS

| | | | |
|---|---|---|---|
| 4,071,703 | 1/1978 | Schaffter | 370/65 |
| 4,074,072 | 2/1978 | Christensen et al. | 370/65 |
| 4,154,986 | 5/1979 | Howells et al. | 370/68 |
| 4,164,627 | 8/1979 | Langenbach-Belz et al. | 370/68 |
| 4,201,890 | 5/1980 | Lawrence et al. | 370/68 |
| 4,228,536 | 10/1980 | Gueldenpfennig et al. | 370/66 |
| 4,355,384 | 10/1982 | Genter et al. | 370/64 |
| 4,377,859 | 3/1983 | Dunning et al. | 370/58 |
| 4,382,295 | 5/1983 | Moffitt et al. | 370/68 |
| 4,485,469 | 11/1984 | Witmore | 370/68 |
| 4,521,880 | 6/1985 | Orsic | 370/68 |
| 4,545,053 | 10/1985 | Raamot | 370/68 |
| 4,564,936 | 1/1986 | Takahashi | 370/58 |
| 4,570,258 | 2/1986 | McCracken | 370/58 |
| 4,601,029 | 7/1986 | Hargrave et al. | 370/67 |
| 4,686,669 | 11/1987 | Chang | 370/68 |
| 4,751,698 | 6/1988 | Bouillot et al. | 370/68 |
| 4,782,479 | 11/1988 | Rozema | 370/68 |
| 4,825,433 | 4/1989 | Deschains | 370/62 |
| 4,835,770 | 5/1989 | Hayano | 370/68 |
| 4,885,738 | 12/1989 | Bowers et al. | 370/58 |
| 5,014,268 | 5/1991 | Tyrrell et al. | 370/68 |
| 5,146,455 | 9/1992 | Goke et al. | 370/68 |

*Primary Examiner*—Douglas W. Olms
*Assistant Examiner*—Dang Ton
*Attorney, Agent, or Firm*—Charles L. Warren

[57] ABSTRACT

A transmission scheme serially propagates time slot data to a plurality of TSI modules with time slot data contained in one TSI frame being serially transmitted from module to module in a daisy-chain technique. A dedicated outbound transmission bus transmits the frame of data from one module to a dedicated inbound transmission bus of another module. The outbound and inbound data buses are connected by separate buses on a backplane which is coupled to each of the TSI modules. Preferably, the TSI modules do not transmit selected ones of the stored data to end destinations until the last TSI module has received the frame of data so that all modules can begin the transmission in time synchronization. Maximum transfer data rates can be achieved since undesired transmission line characteristics or disruptions are minimized by the use of dedicated input and output transfer buses between the modules. Additional modules can be added without disrupting the transmission data rate between existing modules, thereby permitting a growable TSI facility without adversely impacting the data transmission rate between modules.

17 Claims, 6 Drawing Sheets

TIME SLOT INTERCHANGE MODULE

EXPANDABLE TIME SLOT INTERCHANGER

BACKGROUND OF THE INVENTION

This invention relates to time slot interchangers which are used in communication systems employing time division multiplex (TDM) switching techniques. A time slot interchanger (TSI) receives and temporarily stores information contained in time slots in a TDM system so that the information received in one time slot can be subsequently retransmitted during another time slot. Thus, a TSI functions as a switch that routes communications between one party or path associated with a first time slot and another party or path associated with a second time slot.

Although control of a TSI can be implemented in hardware or software, the software implementations offer substantial flexibility as compared with a hardware implementation. In a typical software implementation, random access memory (RAM) stores received information contained in a first time slot at a predetermined address. The RAM location containing this information is subsequently accessed and the information transmitted during another time slot. Each received time slot is associated with a separate RAM address location. Information in an output time slot is obtained by reading the information stored at the RAM address corresponding to an input time slot associated with the output time slot. Encoded digital signals, such as created by pulse code modulation (PCM) techniques, may be utilized to carry the information.

A common application of a TSI is in a telephone switching system where it may cooperate with a space switching module to provide electronically switchable channels for connecting call originating subscribers with called subscribers. A predetermined number of time slots comprise a frame which is utilized for timing and synchronization purposes. A TSI must be capable of handling at least the number of time slots which may be concurrently utilized.

A large telephone switching system places a substantial burden on a TSI utilized in the system. The number of time slots that can be concurrently handled by a TSI limits the maximum number of subscribers which can be handled by the switching facility. For example, a switching facility with a maximum capacity of 15,000 calls would require a corresponding TSI capable of handling 30,000 concurrent time slot assignments since one outbound channel and one inbound channel are required to support each duplex conversation. In order to minimize delays through the switching system, it is desirable to operate a TSI at very high clock speeds. However, the transmission of signals at high clock speeds places demands on the transmission lines or data buses utilized to carry the time slot data to and from a TSI. For large switching systems, physical constraints make it difficult, if not impossible, to construct the TSI function on a single, reasonably sized, printed circuit board or module. The use of separate modules to implement a TSI further aggravates the transmission difficulties encountered at high clock speeds.

Prior art TSI facilities capable of handling a large number of time slots have been constructed as separate modules with input and output slot information communicated to each module in parallel over either a single bus or separate input and output buses. While such implementations have generally been successful, increased capacity demands and the resulting desire for higher clock speeds and faster data transmission capabilities present problems. It is difficult to minimize the undesirable transmission problems, such as transmission line reflections, when parallel bus connections are utilized for high speed data transmission, especially when the number of modules served by the parallel bus can change. In a growable system, adding or removing TSI modules causes a parallel bus to experience a change in impedance. As the number of modules connected to a bus increase, the capacitive load presented by the modules increase making the bus more difficult to drive. In order to provide for resynchronization of the data distributed by a parallel bus, a large number of wide elastic storage devices may be required. Thus, there exists a need for an improved TSI which minimizes these difficulties.

SUMMARY OF THE INVENTION

The present invention minimizes the above problems by providing an improved transmission scheme for interconnecting a plurality of TSI modules. A transmission channel (data bus) carrying all time slot information serially links each TSI module. Time slot information is transmitted over this transmission channel in a daisy-chain technique in which each TSI module receives, stores, and then retransmits the information to the next TSI module.

The technique in accordance with the present invention minimizes the difficulties encountered in parallel bus data distribution schemes of the prior art. Undesired transmission line reflections and load variations are minimized since each TSI module is only required to drive one other TSI module. Since each TSI module preferably stores all of the time slot information, resynchronization of the time slots on each TSI module is accomplished without the requirement of wide elastic buffers. Although frames of time slot information are sequentially transmitted from module to module, output time slot transmissions to separate end destinations are made in parallel from each TSI module via associated transmission links. These advantages of the present invention, as well as others, will be perceived from the description of an illustrative embodiment and the drawings which follow.

BRIEF DESCRIPTION OF THE DRAWINGS

FIG. 8 is a flow diagram illustrating the general processing of a telephone call in a switching system which

DETAILED DESCRIPTION

An embodiment of a time slot interchanger in accordance with the present invention is explained below as being incorporated in a telephone switching environment. Although the TSI is especially suited for such applications, it will be appreciated that it is also suited for use in any TDM system in which time slot switching is utilized.

Figure 1:
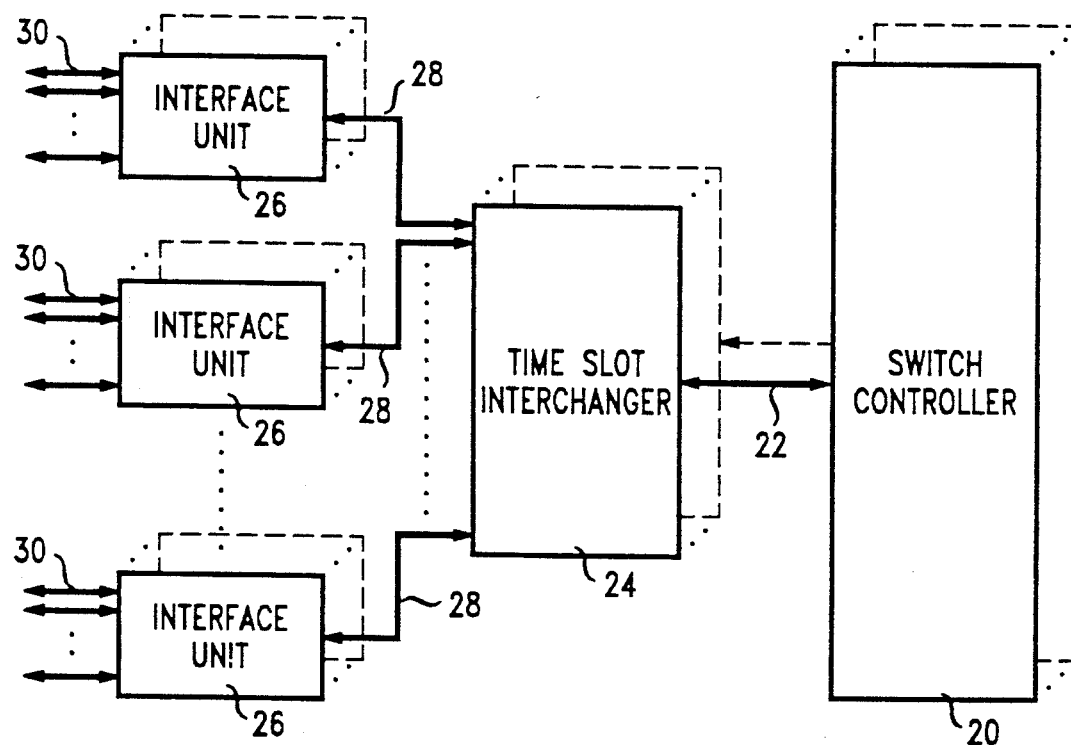
FIG. 1 is a block diagram of a switching system which incorporates a time slot interchange facility in accordance with the present invention.

FIG. 1 shows a block diagram for a telephone switching system which incorporates an embodiment of the present invention. A switch controller 20 is connected by a communication link 22 to a time slot interchanger (TSI) 24. The TSI 24 is controlled by communications received from switch controller 20 and functions as a switch that connects each output time slot corresponding to an input time slot. A plurality of interface units 26 are connected by communication channels 28 to TSI 24. The interface units provide for data expansion or multiplexing between data channels 30 and the TSI 24. The dashed lines in FIG. 1 represent that the switching system can be grown by utilizing corresponding sets of these elements.

Figure 2:
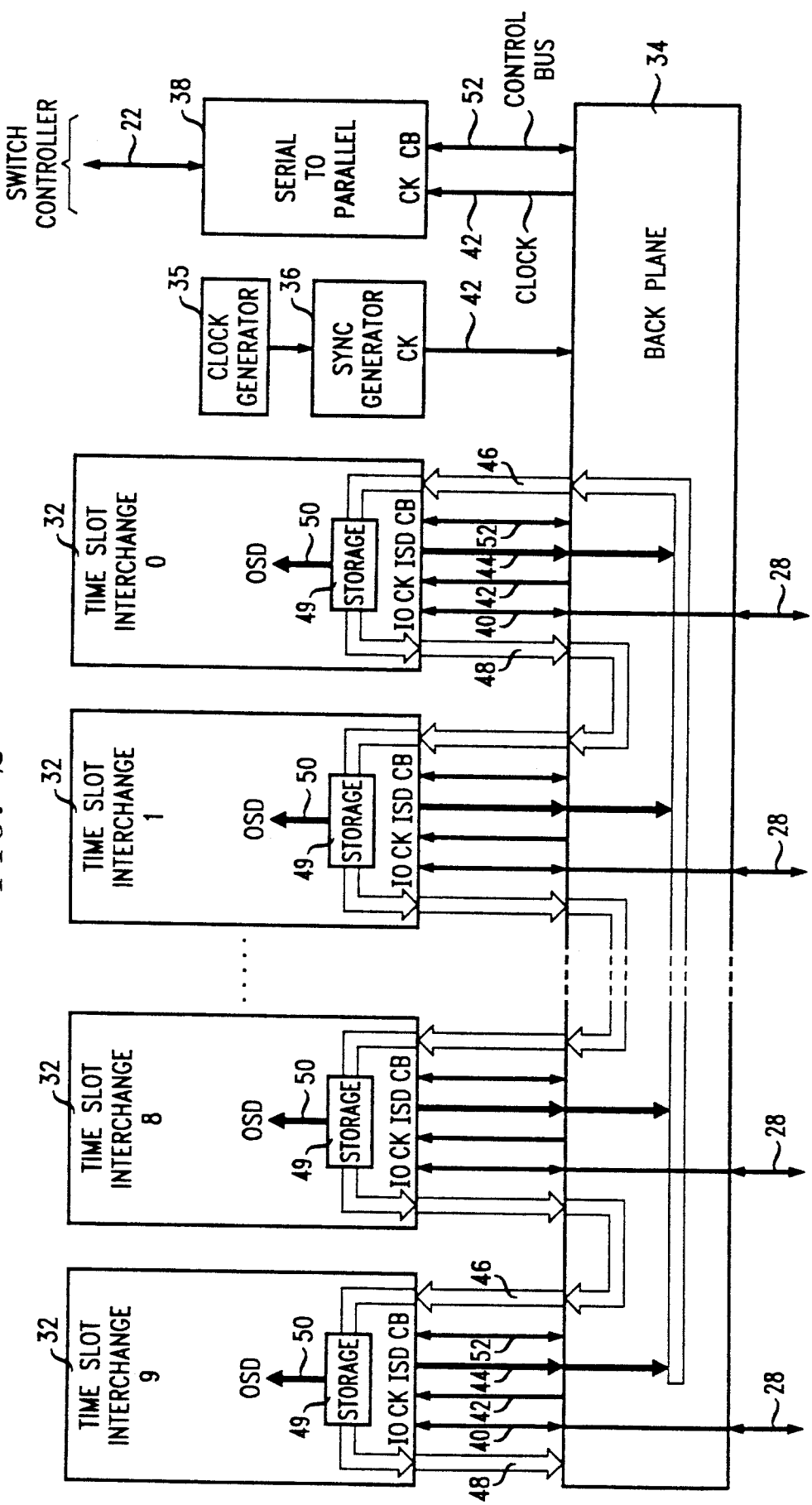
FIG. 2 is a block diagram of an exemplary interchange facility containing a plurality of TSI modules in accordance with the present invention.

FIG. 2 illustrates an embodiment of a time slot interchanger 24 in accordance with the present invention. A plurality of time slot interchanger modules 32 represent physically separated modules or printed circuit boards substantially identical in function and operation. In the illustrative embodiment, ten time slot interchanger modules TSI0-TSI9 are employed to provide a complete time slot interchange facility. Each TSI module 32 is coupled to a backplane 34 which serves to interconnect the modules to each other and to the interface units 26 via channels 28. A clock generator 35 and sync generator 36 provide clock and synchronization information to the TSI modules and to a serial-to-parallel converter 38. The clock and sync generators are is also coupled to switch controller 20 and facilitates clock and synchronization between the switch controller and the time slot interchanger module 32. The serial-to-parallel converter 38 provides a data communication link between the switch controller and the time slot interchange modules. The switch controller provides instructions to the time slot interchange modules by control bus 52 and controls the input/output time slot correlation and other functions of the TSI module as explained below. As used herein, bus refers to all forms of a communication path.

A plurality of communication channels exist between each TSI module 32 and other devices via the backplane 34. A bidirectional input/output channel (IO) 40 couples input data sent from external sources via channels 28 and the backplane 34 to the TSI modules 32. Channel 40 also carries output data transmitted from the TSI modules to external devices via channels 28 and backplane 34. The output data is derived from information contained in selected ones of the inbound time slot information stored in TSI modules 32. A communication channel 42 couples clock and sync information between the TSI modules 32 and the clock/sync generator 36.

The input data received by each TSI module on channel 40 is redistributed as inbound slot data (ISD) on channel 44 and combined on channel 46 to form parallel frames of inbound time slot information. Thus, distribution bus 46 contains all the frames of inbound data received by the TSI modules during each TSI frame. A TSI frame consists of the time interval in which a frame of input data is received via channel 40 and a corresponding frame of output data is transmitted over channel 40. The information contained in the inbound frame from bus 46 is stored in TSI0 during one TSI clock period and retransmitted to the next adjacent module (TSI1) via communication channel 48. A TSI clock period is the time required to receive a set of frames of input data via bus 46; it is also the time required to transmit a set of frames of input data via bus 48. Thus, all input data received during a TSI frame is sequentially received by each TSI module via channel 46, stored in storage element 49 in each module, and transmitted to the next adjacent TSI module via channel 48. In this manner, each module retransmits the information to the next adjacent module in a "daisy-chain" technique. It will be apparent that TSI9, being the last module in the illustrative embodiment, has no requirement to further retransmit the information. However, in order to standardize the manufacture of the TSI modules and to accommodate further growth, bus 48 is routed back to the backplane by TSI9, even though the transfer of information on this bus at the backplane is not utilized.

Outbound time slot data (OSD) is carried by channel or bus 50. The OSD consists of selected inbound time slot information stored in each TSI module and is retransmitted as output data on channel 40 to external devices via backplane 34. The selection of the inbound time slot information functions as the technique by which an inbound time slot is switched to an outbound time slot. Since each TSI module stores all inbound time slots during a TSI frame, the OSD can carry outbound time slot information corresponding to information contained in any of the inbound time slots. As will be explained in greater detail below, the OSD is determined by a control random access memory (CRAM) on each module. The control memory stores control information transmitted from the switch controller 20 by serial-to-parallel converter 38 on control bus 52 to the control memories on each module.

As the number of TSI modules increase, the propagation delay for inbound data to be distributed from TSI0 to the last TSI module will increase. Each TSI module introduces a delay of at least one TSI clock period. However, due to timing considerations, it may be desirable to introduce additional TSI clock periods of delay such as one to receive the time slot data on bus 46 and one to transmit the time slot data via bus 48 to the next TSI module. Data is received from external sources via channel 40 by each TSI module in frame synchronization. Similarly, output data is desirably transmitted by each TSI module over channel 40 to external devices in frame synchronization. Because of the delay introduced by the daisy-chain distribution technique, each TSI module preferably resynchronizes the output data to be transmitted over channel 40 relative to the position of the TSI module to TSI0. Where two TSI clock periods per TSI module are used, TSI0 introduces the largest transmission resynchronization delay of 18 ($2 \times (N-1)$, where N equals number of TSI modules) TSI clock periods in order to account for the delay between TSI0 and TSI9 of the daisy-chain data transmission. Although the individual TSI modules receive the inbound time slot data over channels 46 and 48 at different TSI clock periods, each preferably transmits output data via channel 40 in frame synchronization.

Figure 3:
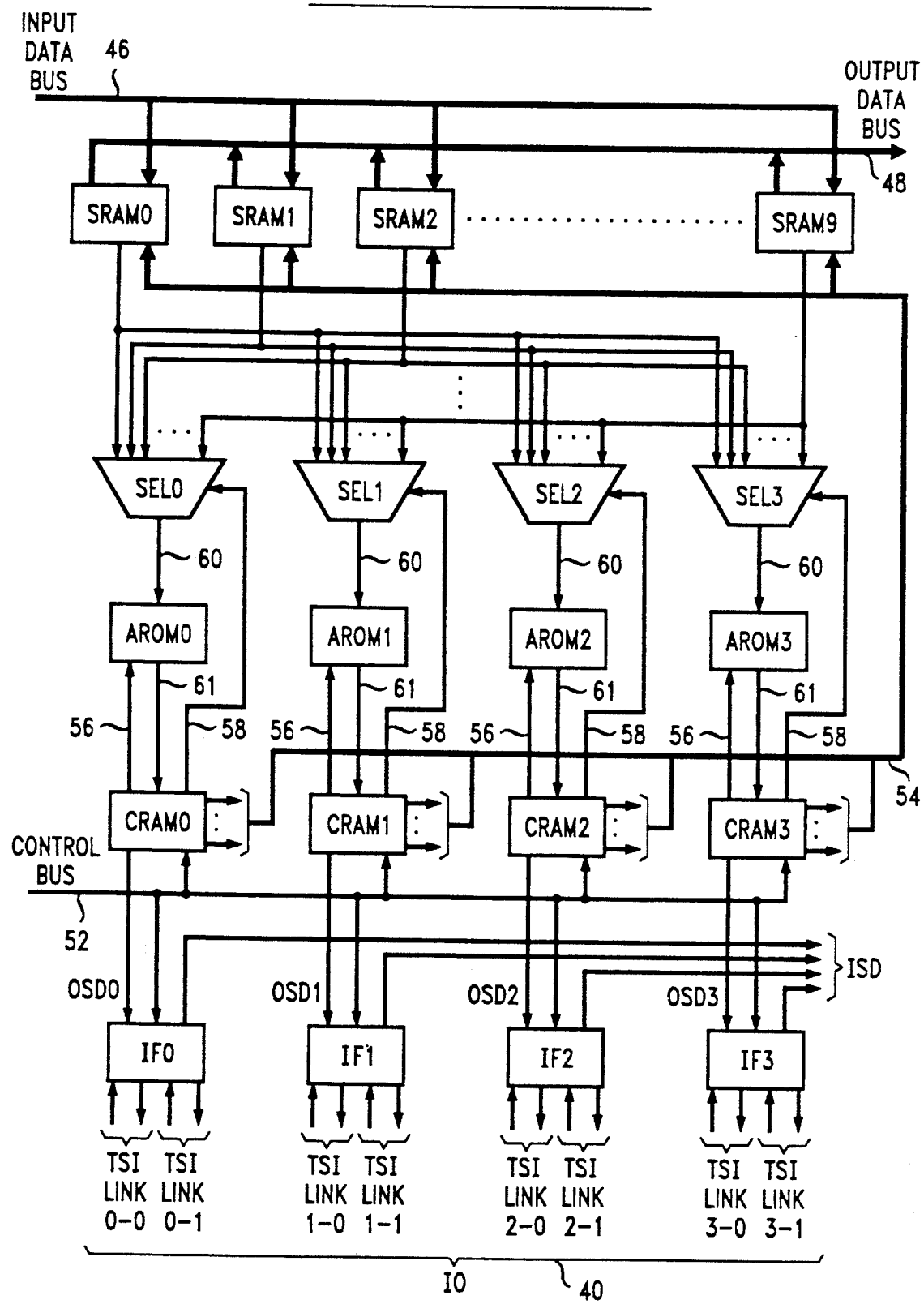
FIG. 3 is a block diagram of an embodiment of a TSI module as shown in FIG. 2.

FIG. 3 is a block diagram of a time slot interchange module 32 in accordance with an embodiment of the present invention. Interface modules IF0-IF3 selectively link four of eight pairs of duplex communication channels, TSI links 0-0, 0-1; 1-0, 1-1; 2-0, 2-1; 3-0, 3-1, to the four incoming slot data (ISD) channels and the four outbound slot data lines OSD0-OSD3. Each interface module functions as a multiplexer permitting a 2:1 fan-in/fan-out of data and is controlled by commands sent by the switching module 20 over control bus 52.

Control random access memory units CRAM0-CRAM3 receive and store control (command) data transmitted from the switch controller via control bus 52. Each CRAM is connected by bus 54 to the address and chip select lines associated with static random access memory units SRAM0-SRAM9. Each inbound time slot in a TSI frame is stored at a separate predefined memory address in SRAM0-SRAM9. Each CRAM is capable of addressing each memory location in each SRAM. This access capability is utilized to select information corresponding to one inbound time slot for transmission during an output time slot.

Each CRAM is also connected by channel 56 to a corresponding amplitude controlling read-only memory AROM0-AROM3. Each AROM functions as a look-up table and is utilized to condition information selected from an SRAM prior to retransmission as output data. The AROM addressing is dependent on the PCM data retrieved from a location in a SRAM and on control data sent to the AROM over channel 56 from the corresponding CRAM. The data output on channel 61 by the AROM represents PCM data received from the SRAM with increased, no change, or decreased amplitude. Each CRAM provides control information to a corresponding AROM that determines if attenuation or amplification is to be provided, and if so, the amount. Each CRAM is connected by a channel 58 to a corresponding selector SEL0-SEL3. In response to a selection command sent from a CRAM via channel 58, each selector selects one of the SRAM's and couples the information stored at an address location in the selected SRAM as an output of the selector on line 60.

The input bus 46 is coupled to each SRAM and consists of four buses for each TSI module. Thus, in the illustrative embodiment, bus 46 would comprise 40 (4×10) separate buses with each bus carrying one frame of inbound time slot data during a TSI frame. Output bus 48 also coupled to each SRAM is similarly configured and carries the information stored in the SRAM's to the next TSI module. Thus, SRAM0-SRAM9 must store in the aggregate 40 frames of information. The organization of each SRAM and CRAM is explained below. In the interest of readability, clock signals are not shown on FIG. 3. However, those skilled in the art will appreciate that clock signals are distributed to each of the elements shown in FIG. 3.

Figure 4:
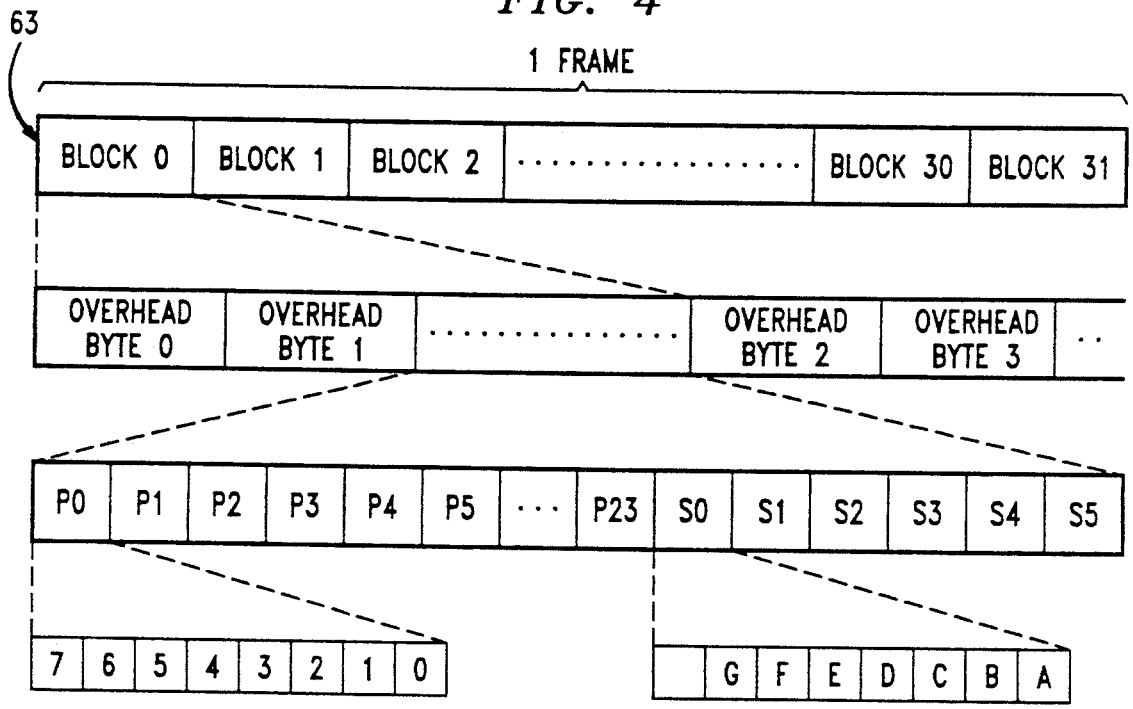
FIG. 4 is a diagram illustrating an exemplary arrangement for the transmission of data in accordance with the present invention.

FIG. 4 illustrates a format diagram of an exemplary frame 63 of inbound and outbound data. Each of the four interface modules on each TSI module receives or transmits one frame 63 of data during a TSI frame. In accordance with the illustrative embodiment, each TSI frame consists of 40 (10×4) of such data frames. The input data bus 46 and output data bus 48 on each TSI module carry 40 frames of data during each TSI clock period. Each data frame consists of 32 blocks, i.e., block 0-block 31. Each block consists of overhead bytes 0 and 1, 24 bytes of PCM data P0-P23 where each byte corresponds to a voice sample encoded in one time slot, and six bytes of signaling data S0-S5. Each of the PCM bytes consist of eight binary coded bits 0-7. Each signaling byte consists of seven bits, A-G of binary encoded bits. The signaling bytes and overhead bytes are utilized as is known to those skilled in the art to control data communication flow, synchronization, error detection, error correction, and other information, depending upon the design parameters and environment of the system utilizing the TSI facility. In the illustrative example, each data frame supports 768 (32×24) separate time slots each typically carrying a voice transmission from one party to another.

Figure 5:
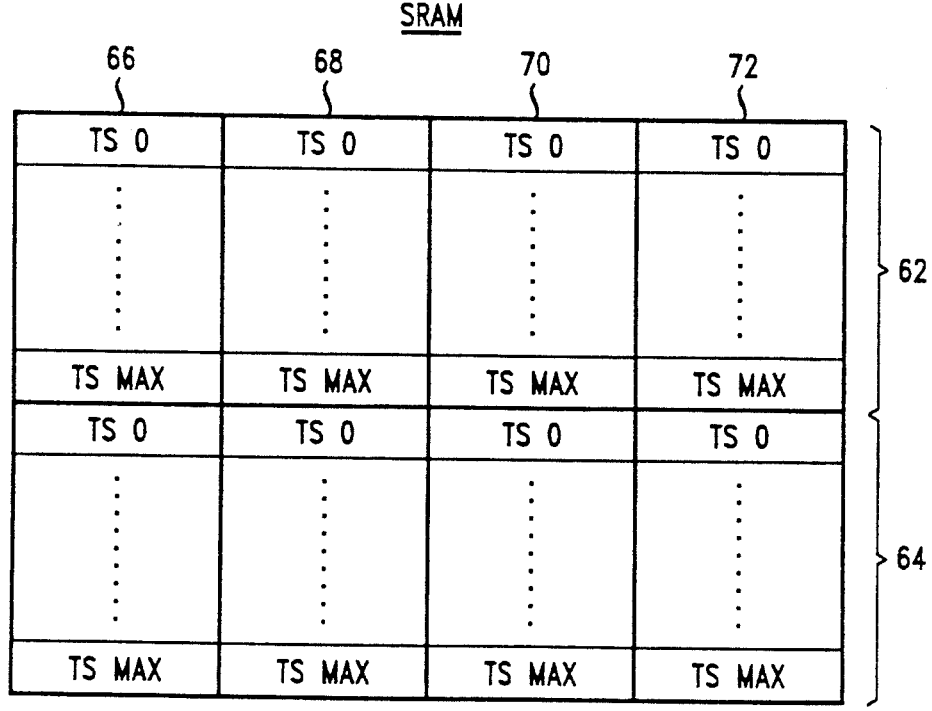
FIG. 5 depicts the storage of the time slot data in the SRAM memory elements as shown in FIG. 3.

FIG. 5 is a representation of a SRAM as illustrated in FIG. 3 to facilitate visualization of the storage of the time slot information. In order to equally distribute the storage requirement, each of the 10 SRAM's stores four frames of input time slot data, i.e., 3072 time slots of data (4×768) in a first section 62. Each SRAM may be visualized as comprised of a first section 62 and a second duplicate section 64, each capable of storing four frames of time slot data. The second duplicate section 64 is only required if a double buffering technique which is known in the art is utilized. Double buffering requires the storage of two consecutive TSI frames of data so that one section of data is read while the other section is written to with new information. Each SRAM may be further visualized as segregated into parallel columns 66, 68, 70, and 72 of memory, wherein each column stores one frame of time slot data. Each column in one section contains 768 rows which accommodates 768 bytes of information. Each byte of time slot information stored in each SRAM is separately addressable. This permits an output time slot to be associated with any of the input time slots, thereby providing a nonblocking TSI function wherein previous time slot assignments do not limit the remaining time slot assignments which can be made. If the double buffering technique is not utilized, section 64 of each SRAM is not required, thereby reducing the total memory storage requirement by one half.

Each byte in one data frame is stored in sequence in one column of an SRAM as shown in FIG. 5, resulting in the storage of time slot TS0 through time slot TS maximum, which corresponds in the illustrative embodiment to TS 767. Since each of the storage locations can be separately addressed to retrieve the information stored at any of the locations during an output time slot, the direct sequential storage of time slot bytes in each frame is facilitated.

Figure 6:
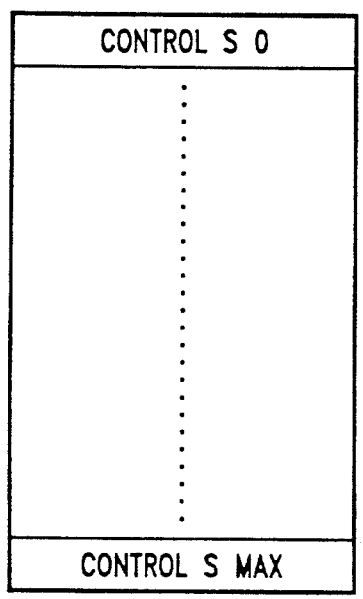
FIG. 6 depicts the arrangement of control information stored in CRAM memory elements of FIG. 3.

FIG. 6 is a representation of the storage of control words in each CRAM. Each CRAM stores a control word, described in detail below, for each of the inbound time slots in one frame, i.e., in the illustrative example 768 control words. Each control word addresses a memory location in one of the SRAMs containing information corresponding to one of the input time slots. The CRAM is organized sequentially from control slot S0 to control slot S maximum (767 in the illustrative example) and is sequentially addressed from S0 to S max to generate a frame of output data. Output time slots 0-767 in each frame correspond to S0-S767 in the CRAM. Part of each control word contains an address to one memory location in an SRAM and identification of which SRAM0-SRAM9 to select. Cycling through the CRAMs thereby identifies for each outbound time slot information a corresponding inbound time slot.

Figure 7:
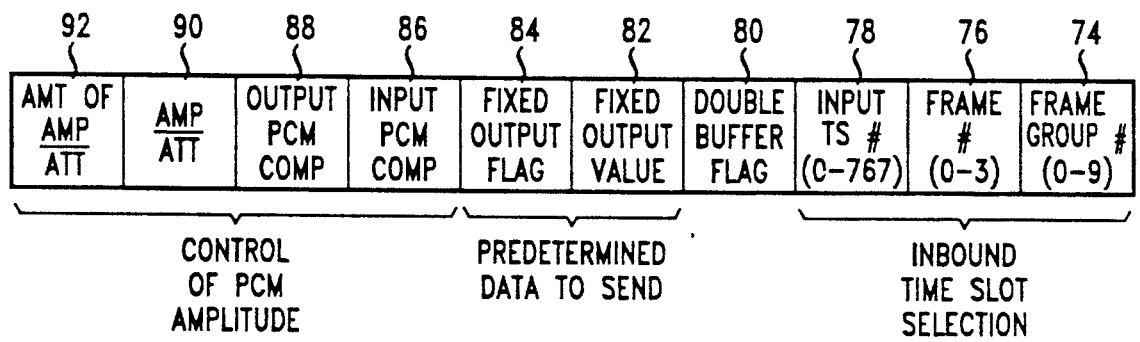
FIG. 7 illustrates a representative format of control information stored in the CRAM memory shown in FIG. 6.

FIG. 7 illustrates a representative format for each control word utilized in the CRAMs. Each control word preferably contains at least four sections: (a) identification of an inbound time slot; (b) a flag which determines if a double buffering technique is to be utilized; (c) identification if an output time slot is to contain a predetermined PCM byte instead of accessing the data stored in an inbound time slot; (d) a series of fields which are utilized by a corresponding AROM to control the amplitude of the output PCM data.

The time slot selection information in the control word includes fields 74, 76, and 78. Field 74 identifies one of the ten sets of four data frames associated with the four ISD buses on each TSI module. Buses 46 and 48 consist of ten sets of buses, each set containing four buses corresponding to the four frames of data received by each TSI module during a TSI frame. Since each bus set corresponds to one TSI module, this field can also be considered as selecting one of the TSI modules. Field 76 identifies a particular bus of the set of four buses (frames) identified by field 74. Field 78 identifies a specific input time slot, i.e., 0–767 sent over the selected bus (frame). It will be understood that the actual data contained in fields 74, 76, and 78 correspond to an addressing structure so that the cumulative information contained in these fields define a specific address location in one of the SRAMs. The time slot input/output correlations are controlled by the control words in the CRAMs which are received on the control bus from switch controller 20.

Field 80 contains a flag which determines whether double buffering is to be utilized. Fields 82 and 84 are associated with the transmission of a defined output value during the output time slot. If the fixed output flag in field 84 is set, the fixed output value stored in field 82 as a PCM word is transmitted during the corresponding outbound time slot regardless of data contained in a corresponding input time slot. This capability is useful for defining fill data to be transmitted when an output time slot is not utilized and can be utilized to transmit information to the subscriber which doesn't change, such as the transmission of silence while a subscriber is inputting Touch-tone digits to a called party.

Fields 86, 88, 90, and 92 contain information which controls the amplification or attenuation of the PCM data contained in the associated time slot. Fields 86 and 88 contain flags which determine the type of PCM compression, $\mu$ law or A-law, associated with the input and output PCM values. The flag in field 90 determines if the PCM word is to be amplified or attenuated. If the PCM word is to be amplified or attenuated, the amount of the amplification or attenuation in decibels is contained in data stored in field 92. The gain control information contained in these fields is utilized as part of an address for the AROM associated with the CRAM containing the control word. Each AROM may be considered as a look-up table of predetermined, stored PCM data words with the selection of the word to be transmitted, determined by the input PCM word from channel 60 and the data contained in fields 86–92 from the CRAM. The selected PCM value is output to the CRAM on channel 61.

Figure 8:
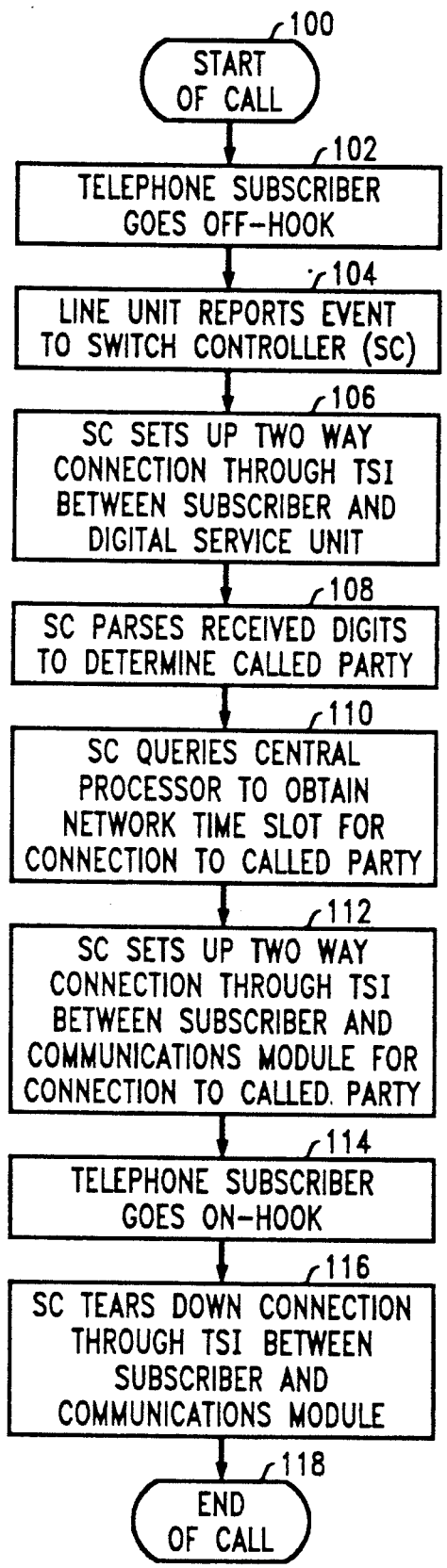

FIG. 8 is a flow diagram illustrating the processing of a telephone call in a switching system, such as a 5ESS ® switch, which incorporates a time slot interchanger in accordance with the present invention. Beginning with the start of call 100, a telephone subscriber goes off-hook as indicated by step 102. In step 104 a line unit connected to the subscriber's telephone line reports the off-hook event to the associated switching module. As indicated in step 106, the switch controller responds by setting up a two-way connection through the TSI between the subscriber and a digital service unit (DSU- not shown) contained in the switching system. The DSU functions to send dial tone and receive digits from the subscriber. In step 108, the switch controller parses the received digits to determine routing utilized t reach a called party which is assumed in this example, to be serviced by a different TSI. Then, in step 110, the switch controller queries a central processor in the switching system to obtain a network time slot allocation for connection to the called party. In step 112 the switch controller sets up a two-way connection through the TSI between the subscriber and a communications module (CM) for connection to the called party. The initial connection from the subscriber to the DSU is torn down or disconnected since this path is no longer needed. The subscriber portion of the connection which comprises an input time slot to the TSI may be rerouted to an outbound time slot for connection to the CM. Thus, the calling party and the called party now have established two-way communications using one inbound/outbound time slot for communications sent from the calling party and another inbound/outbound time slot for communications sent from the called party. At the conclusion of the communication session, the subscriber goes on-hook as indicated in step 114. This causes the switch controller to tear down the connections through the TSI between the subscriber and the called party as indicated in step 116. Thus, the input and output time slots associated with the communication links are released for further assignment. This ends the flow of a telephone call through a TSI in accordance with the present invention as indicated at step 118.

The illustrative embodiment of a TSI in accordance with the present invention achieves the advantages discussed above. The use of TSI modules permits a growable TSI facility capable of being operated at high clock speeds. By the use of the daisy-chain time slot distribution between TSI modules, adding or removing TSI modules to the end of the series of modules does not change the intermodule transmission characteristics. The capacitive load presented to an intermediate TSI module is fixed since the addition of modules only affects the output load of the last existing TSI module. The impedance among the driving bus circuitry for one TSI module, the receiving bus circuitry of the adjacent TSI module, and the transmission line impedance of the bus interconnecting them is not substantially affected as more modules are added, thereby minimizing reflections caused by system growth.

Although an embodiment of the present invention has been shown and illustrated in the drawings, the scope of the invention is defined by the claims which follow.

We claim:

1. A time slot interchanger comprising:
    time slot interchange (TSI) modules each including means for receiving all time slot data in one TSI time frame via an inbound data bus, means for storing said time slot data, means for transmitting said received time slot data via an outbound data bus, and means for transmitting selected ones of the stored time slot data as output data on communication channels coupled to each TSI module,
    transmission channel means for connecting said outbound data bus of each TSI module to said inbound data bus of a next TSI module; and
    means for sequentially transferring said received time slot data from each TSI module to the next TSI module via said transmission channel means, said transferring means sequentially transferring all time slot data in a certain TSI time frame from a first TSI module to a last TSI module before starting transfer of time slot data in a next TSI time frame.

2. The time slot interchanger according to claim 1 wherein each TSI module comprises means for receiving input data on said communication channels, and means for transferring said received input data to said inbound data bus of a first TSI module, said input data received over said inbound data bus of said first TSI module comprising said time slot data for said first TSI module.

3. The time slot interchanger according to claim 1 wherein said transmission channel means comprises a series of buses disposed on a backplane module to which each TSI module is coupled.

4. The time slot interchanger according to claim 2 wherein said transmission channel means comprises a series of buses disposed on a backplane module to which each TSI module is coupled.

5. The time slot interchanger according to claim 1 wherein said transferring means effects the transfer of time slot data so that the number of TSI clock time periods required for one frame of said time slot data to propagate from the first to the last TSI module is proportional to the number of TSI modules.

6. The time slot interchanger according to claim 1 wherein said outbound data bus from a prior TSI module is only coupled to said inbound data bus of a next TSI module so that adding additional TSI modules does not significantly impact the transmission line characteristic of the path from the outbound data bus of an existing TSI module to the inbound data bus of the next existing TSI module.

7. The time slot interchanger according to claim 1 further comprising means for synchronizing said TSI modules so that said selected ones of the stored time slot data are not transmitted from any TSI module until every TSI module has received said time slot data for the same TSI frame.

8. A method for distributing data contained in time slots of a time division multiplexed system in which a plurality of time slot interchange (TSI) modules are utilized comprising the steps of:
receiving by a first TSI module a plurality of data corresponding to a number of time slots in one TSI frame and storing the data received during the frame;
transmitting by the first TSI module all of said stored data to a next TSI module which receives and stores the data;
each TSI module sequentially receiving all of the data in a frame from a preceding TSI module, storing the data in the frame, and retransmitting the stored data to the next TSI module;
said first TSI module initiating transmission of data associated with a next TSI frame only after the data associated with the last transmitted frame is received by a last TSI module.

9. The method according to claim 8 further comprising the steps of:
receiving input data by each TSI module on communication channels; and
transferring the received input data to a first TSI module.

10. The method according to claim 8 further comprising the steps of:
transmitting by each TSI module selected ones of the stored time slot data as output data on communication channels for transmission to an end destination.

11. The method according to claim 8 further comprising the steps of:
receiving by each TSI module the frame of data via an inbound data bus and transmitting the stored frame of data via an outbound data bus, each outbound data bus coupled to only an inbound data bus of another TSI module so that the frames of data are sequentially sent and stored by each TSI module in a daisy-chain technique.

12. The method according to claim 8 further comprising the steps of:
synchronizing the transmission of selected ones of the stored time slot data via communication channels coupled to end destinations so that the transmission of said selected ones does not begin until the last TSI module has received the same frame of data stored by a first TSI module.

13. The method according to claim 8 further comprising the steps of:
maximizing the rate at which the frames of data can be transferred from one TSI module to another TSI module by utilizing dedicated buses which only connect the outbound data bus of the transmitting TSI module to the inbound data bus of the adjacent receiving TSI module, thereby minimizing transmission line characteristic variations which would occur if other devices could access the sequential buses.

14. The method according to claim 8 wherein a last TSI module receives the frame of data received by the first TSI module a number of TSI clock time periods after the first TSI module transmitted the data, the number of TSI clock time periods being proportional to the number of TSI modules.

15. A time slot interchanger comprising:
time slot interchange (TSI) modules each including means for receiving all time slot data in one TSI time frame via an inbound data bus, means for storing said time slot data, means for transmitting said received time slot data via an outbound data bus, and means for transmitting selected ones of the stored time slot data as output data on communication channels coupled to each TSI module,
transmission channel means for connecting said outbound data bus of each TSI module to said inbound data bus of a next TSI module; and
means for sequentially transferring said received time slot data from each TSI module to the next TSI module via said transmission channel means; and
means for synchronizing said TSI modules so that said selected ones of the stored time slot data are not transmitted from any TSI module until every TSI module has received said time slot data for the same TSI frame.

16. A time slot interchange (TSI) module comprising:
means for receiving all time slot data in one TSI time frame via an inbound data bus;
means for storing said time slot data;
means for transmitting said stored time slot data via an outbound data bus;

means for transmitting selected ones of the stored time slot data as output data on a communication channel coupled to said TSI module;

said transmitting means transmitting the selected ones of the stored time slot data as output data upon a predetermined number of TSI clock time periods having occurred since said time slot data was received by said receiving means.

17. A method for distributing data contained in time slots of a time division multiplexed system in which a plurality of time slot interchange (TSI) modules are utilized comprising the steps of:

receiving by a first TSI module a plurality of data corresponding to a number of time slots in one TSI frame and storing the data received during the frame;

transmitting by the first TSI module the received data to a next TSI module which receives and stores the data;

each TSI module sequentially receiving the data in a frame from a preceding TSI module, storing the data in the frame, and retransmitting the received data to the next TSI module; and synchronizing the transmission of selected ones of the stored time slot data via communication channels coupled to end destinations so that the transmission of said selected ones does not begin until the last TSI module has received the same frame of data stored by a first TSI module.

* * * * *